Feb. 10, 1931.  R. SELIGMAN  1,792,328
HOLDING PROCESS FOR STERILIZING OR PASTEURIZING LIQUIDS
Filed July 19, 1928  4 Sheets-Sheet 1
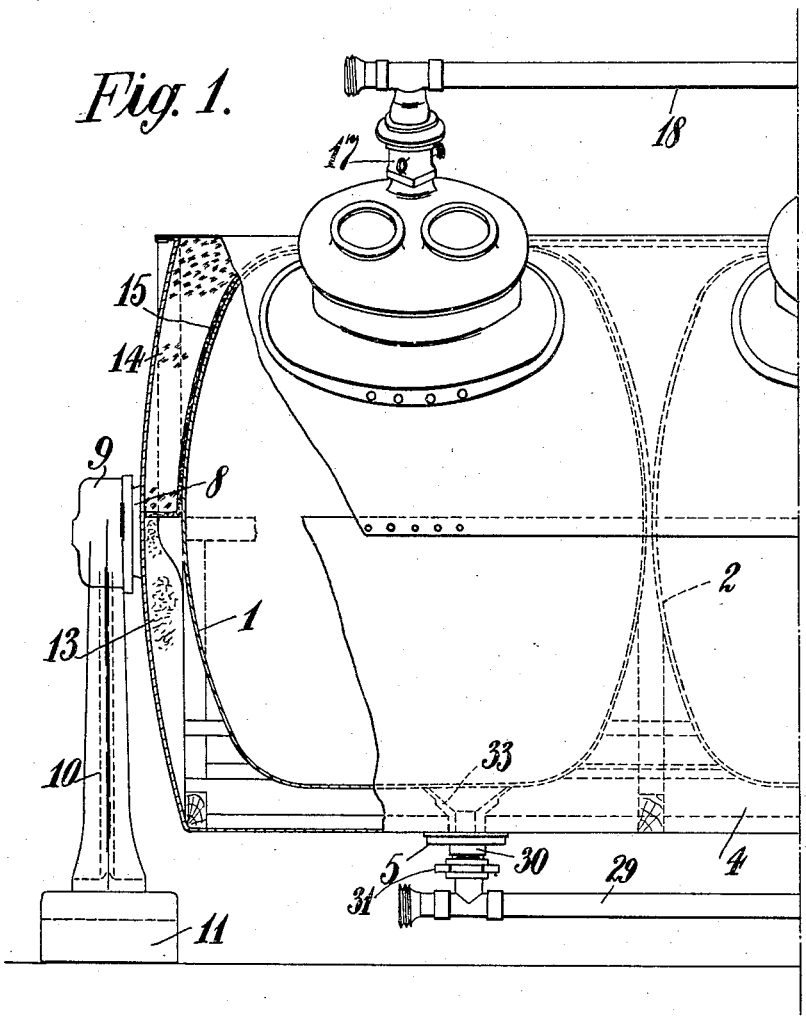
INVENTOR
Richard Seligman
BY
Ernest Wilkinson
ATTORNEY

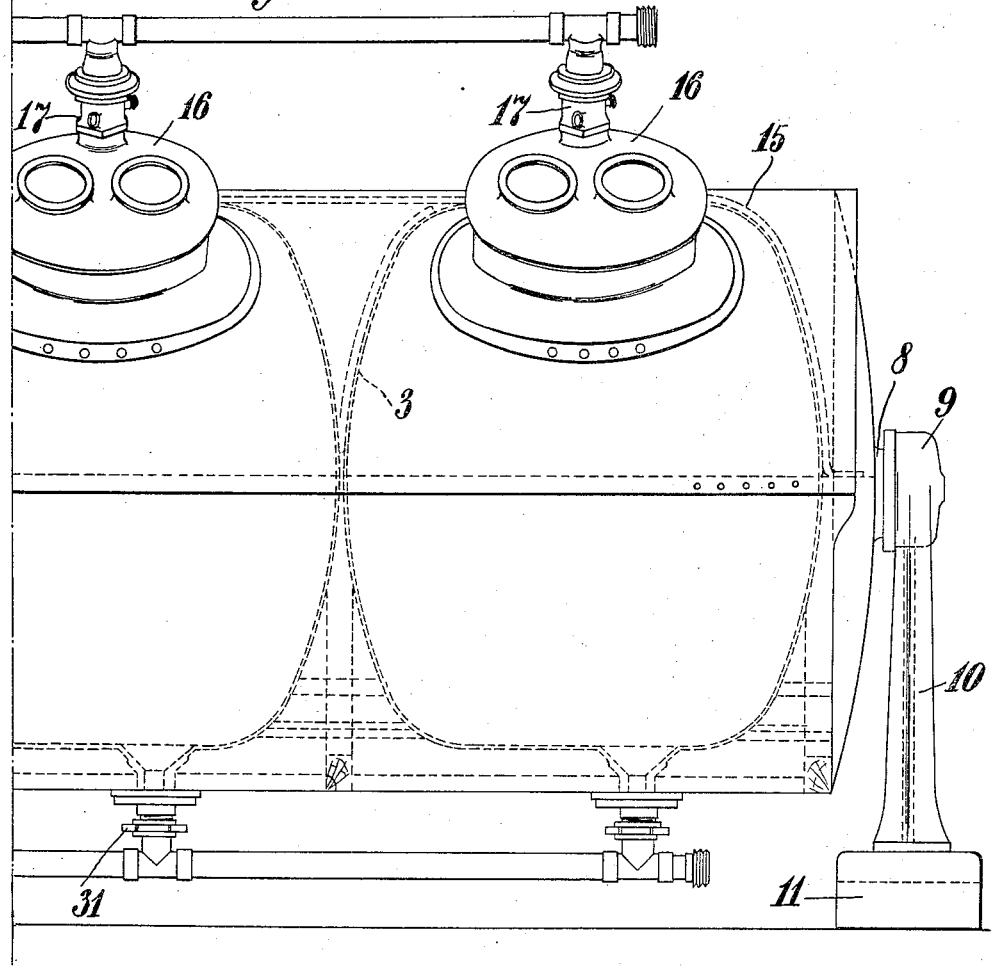

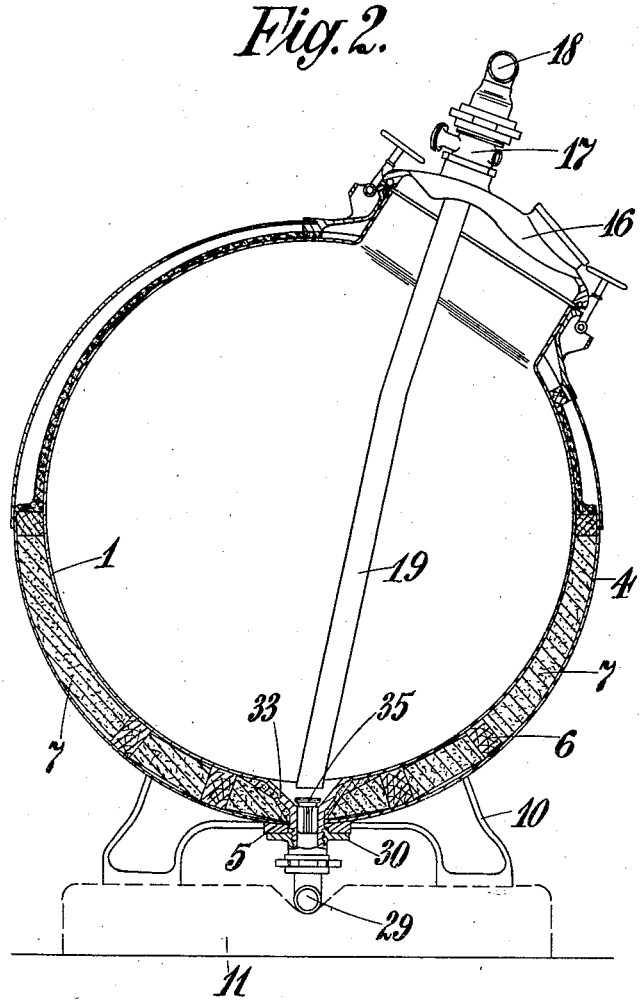

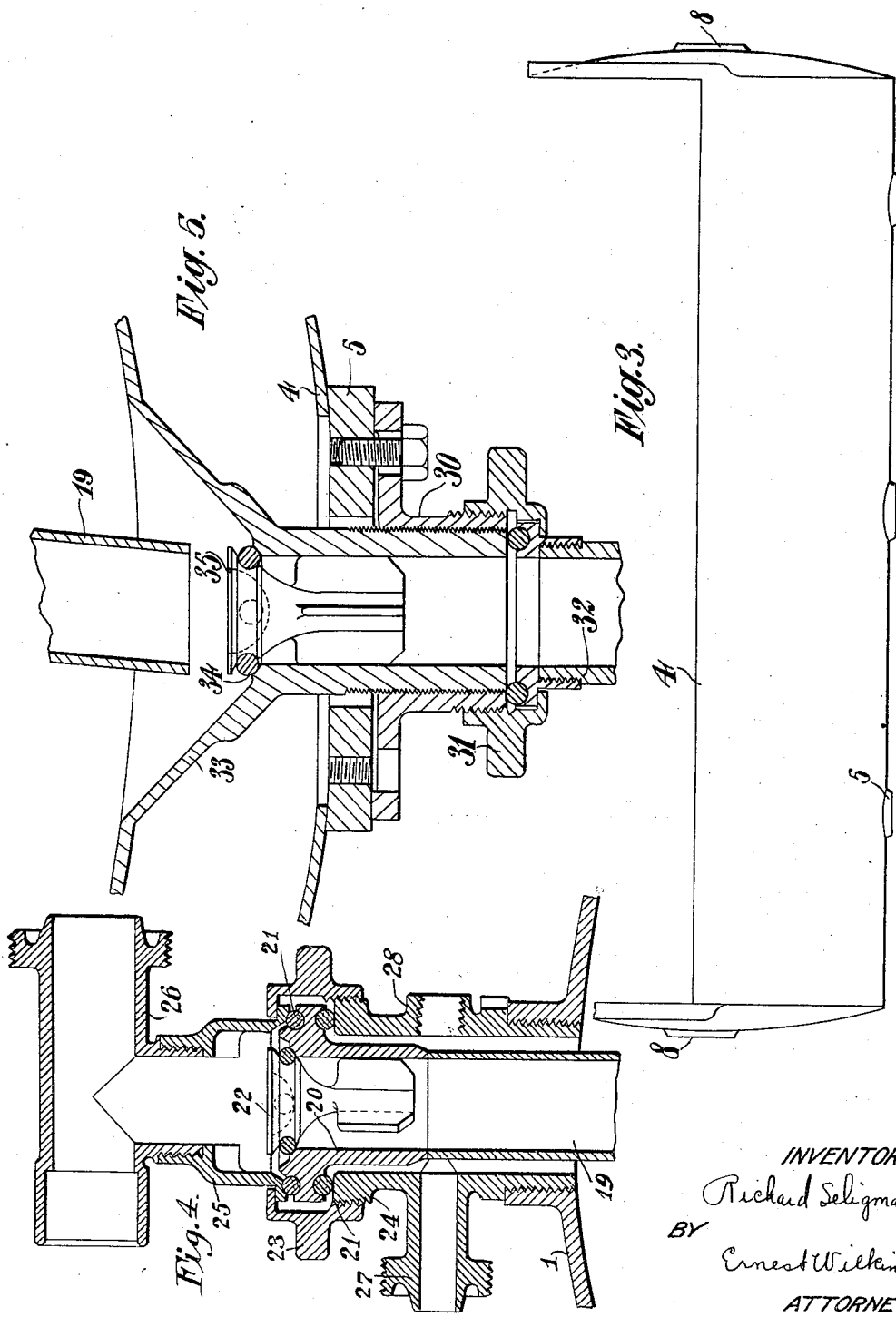

Patented Feb. 10, 1931

1,792,328

UNITED STATES PATENT OFFICE

RICHARD SELIGMAN, OF LONDON, ENGLAND, ASSIGNOR TO THE ALUMINIUM PLANT & VESSEL COMPANY, LIMITED, OF LONDON, ENGLAND

HOLDING PROCESS FOR STERILIZING OR PASTEURIZING LIQUIDS

Application filed July 19, 1928, Serial No. 293,932, and in Great Britain September 29, 1927.

This invention relates to sterilizing or pasteurizing milk and other liquids by the holding process in which holding tanks or vessels are filled and discharged under the influence of a difference of pressure produced on the opposite sides of the said tanks or vessels.

The present invention is directed to improvements in and relating to the holders or tanks in which the liquid is held for a definite length of time before being discharged, and has special reference to that form of holding tank or vessel in which the liquid is caused to flow thereinto by means of a vacuum and is discharged therefrom by compressed air.

According to one feature of the present invention there is provided a lay-out of holders or tanks, in which the manufacturing costs are appreciably reduced and working economies effected.

Apparatus according to the present invention is eminently suited for plants of moderate capacity. By the present invention there is provided a plant having a compact lay-out with an absence of complexity of connections, and all parts are readily accessible for working control.

Thus, according to the present invention there is provided a multi-tank holder in which the several tanks are formed by separate independent like or similar constructions conforming to a design suited to render each tank by itself capable of withstanding the applied pressures, and these tanks are mounted in a shell or cradle with interposed lagging and appropriate filling and discharging fittings for duty as a battery-unit.

Another feature of the present invention is the provision of a holder or tank in which most of the working apparatus are not in the nature of separate attachments thereto but are contained in or on a separate unit, this unit being in the nature of a detachable fitting hereinafter called the discharge fitting which may be connected to the man-way or inspection cover.

According to a further feature of the present invention the circulation of the liquid in a holder or tank is promoted by a graduated insulation of the holder or tank, for example, the insulating material may be graduated from the upper part of the holder or tank downwards, so that the temperature slope is sharper or steeper at the top half of the holder or vessel than it is at the lower half thereof for a given time factor.

Another feature under the present invention is the positioning of the discharge pipe for the liquid from the holder, so that the inlet valve for the liquid can open but cannot get dislodged from its seating.

The accompanying drawings show, by way of example, a holder or tank unit embodying all the features above set out.

In the drawings:—

Fig. 1 is a sectional side elevation, and Fig. 2 a sectional end elevation of the holder or tank unit. Fig. 3 is a side view of the shell or cradle for carrying the holders. Fig. 4 is a sectional elevation of the discharge fitting and Fig. 5 a sectional elevation of the inlet fitting.

The lay-out illustrated is a three compartment holder, but any convenient number of holders may be used. The assemblage shown is a side-by-side one.

The three holders 1, 2 and 3, are assembled in a shell or cradle 4. The bottom of the shell 4 has flanges 5 to which are attached the inlet fittings for the holders 1, 2 and 3.

The holders 1, 2 and 3 are supported on timbers 6 and timber curbs 7.

The shell 4 has trunnion rings 8 which work in trunnions 9 provided on end brackets 10 rising from bases 11. A locking gear may be fitted at one end bracket. By this trunnion mounting all the tanks or holders can be rotated into a convenient position for cleaning at one and the same time. An eccentric mounting of the holders in the shell may be effected so as to provide for a graduated insulation and to allow for the balancing of the various parts.

A graduated insulation of the holders may be obtained in various ways. The depth of the insulation may be varied or graduated over the holder or vessel. For example the depth of insulation at the top may be less than the depth at the bottom.

In the constructional example shown the bottom parts of the holders are insulated by granulated cork 13, and the ends of the outside vessels by broken cork 14. The top half of the vessels are covered with felt 15. The insulation may be held to position by any suitable means.

The holders 1, 2 and 3 may rest on cork instead of on the timbers aforesaid.

Each holder has a man-way or inspection closure 16 which is off center thus facilitating inspection of the contents of the holder.

On the man-way 16 is a fitting 17 which is termed the discharge fitting. Each discharge fitting communicates with a discharge manifold 18.

This fitting is arranged to carry connections for the vacuum and air pipes, the pressure gauge and other appropriate parts. Fig. 4 shows an arrangement of discharge fitting. In this view, 19 is the discharge pipe which is welded to a flanged liner 20 having packing 21. An outlet valve 22 is seated on 20. A union nut 23, screwing on to the casing 24, connects the liner 20 to an adaptor part 25 which is screwed to a T-piece 26 forming part of the discharge manifold 18. The casing 24 is screwed to the man-way cover. 27 is the branch for the air and vacuum pipe. 28 is a boss tapped to take an air-cock.

Each vessel or holder has an inlet fitting communicating with an inlet manifold 29. Fig. 5 shows the inlet fitting. The casing 30 of the fitting is connected by a nut 31 to a T-piece 32 forming part of the inlet manifold 29. The casing 30 is bolted to the flange 5 welded to the shell 4. The holder has a sump 33 in which is a seating 34 for an inlet valve 35.

As shown in Figs. 2 and 5 the discharge pipe 19 extends down nearly to the bottom of the interior of the vessel or holder, and the pipe is so arranged that the end thereof remote from the discharge fitting functions to prevent the inlet valve 35 from becoming dislodged from its seating.

In certain cases the inlet and discharge manifolds have to be removed and replaced after each day's work, and by the arrangement of apparatus according to the present invention it is much more convenient to do this when the vessels are in the cleaning position than when they are in the working position, i. e., in an approximate vertical position, in which position it is necessary to get underneath and on top of the tanks to remove and replace the manifolds.

In the particular form of apparatus described as an example, the process of pasteurizing or sterilizing is carried out by causing the liquid to flow into the holding vessel by means of a vacuum pump communicating with the vacuum connection 27 on the discharge fitting, the liquid entering the vessel through the aforesaid non-return inlet valve 35 at the bottom of the vessel. During the holding period the vessel may be related to the atmosphere through the air pipe before mentioned. The liquid leaves the vessel through the aforesaid discharge pipe 19 and the non-return valve 22.

A single holder with graduated insulation may be carried in the shell or cradle aforesaid.

In the apparatus illustrated each individual tank as a separate unit can be made by a repetition process, and such tank is of a cylindrical shape with dished ends, such a construction being well suited to stand the working pressures, as for example, filling by vacuum and discharging by compressed air.

What I claim is:—

1. In apparatus used in the holding process for pasteurizing milk and other liquids in which holding tanks are filled and discharged under the influence of a difference of pressure produced on the opposite sides of the said tanks, a multi-tank holder for duty as a battery unit, in which the several insulated tanks are formed by separate independent similar constructions conforming to a design suited to render each tank by itself capable of withstanding the applied pressures, a cradle in which said tanks are mounted, filling and discharging fittings for said tanks, and off-centre inspection closures for said holders.

2. In apparatus used in the holding process for pasteurizing milk and other liquids in which holding tanks are filled and discharged under the influence of a difference of pressure produced on the opposite sides of the said tanks, a multi-tank holder for duty as a battery unit, in which the several insulated tanks are formed by separate independent similar constructions conforming to a design suited to render each tank by itself capable of withstanding the applied pressures, a cradle in which said tanks are mounted, off-centre inspection closures for said holders, and filling and discharging fittings for said tanks, said discharge fittings having multiple connections or attachments, and said discharge fittings being carried by said closures.

3. In apparatus used in the holding process for pasteurizing milk and other liquids in which holding tanks are filled and discharged under the influence of a difference of pressure produced on the opposite sides of the said tanks, a multi-tank holder for duty as a battery unit, in which the several tanks are formed by separate independent similar constructions conforming to a design suited to render each tank by itself capable of withstanding the applied pressures, filling and discharging fittings for said tanks, a cradle in which said tanks are mounted, said cradle being mounted so as to bring the holders from the working positions to the cleaning positions, and vice versa, and inlet and outlet manifolds connected respectively to said filling and discharging fittings, said inlet and outlet manifolds turning with the cradle.

4. In apparatus used in the holding process for pasteurizing milk and other liquids in which holding tanks are filled and discharged under the influence of a difference of pressure produced on the opposite sides of the said tanks, a battery-unit comprising a cradle mounted on a rotating axis, a number of insulated holders carried by said cradle, the holders having discharge fittings and inlet fittings, and inlet and outlet manifolds turning with said cradle.

5. In apparatus used in the holding process for pasteurizing milk and other liquids in which holding tanks are filled and discharged under the influence of a difference of pressure produced on the opposite sides of the said tanks, a battery-unit comprising a cradle mounted on a rotating axis, a number of insulated holders carried by said cradle, a discharge fitting and an inlet fitting for each holder, and means to prevent the inlet valve in said inlet fitting from becoming dislodged from its seating.

6. In apparatus used in the holding process for pasteurizing milk and other liquids in which holding tanks are filled and discharged under the influence of a difference of pressure produced on the opposite sides of the said tanks, a battery-unit comprising a cradle mounted on a rotating axis, a number of insulated holders carried by said cradle, an offset inspection or man-hole closure for each of said holders, and discharge fittings and inlet fittings for said holders, said discharge fittings being carried by said closures.

7. In apparatus used in the holding process for pasteurizing milk and other liquids in which holding tanks are filled and discharged under the influence of a difference of pressure produced on the opposite sides of the said tanks, a battery-unit comprising a cradle mounted on a rotating axis, a number of insulated holders carried by said cradle, the holders having discharge fittings and inlet fittings, each of said discharge fittings having multiple connections or attachments.

8. In apparatus used in the holding process for pasteurizing milk and other liquids in which holding tanks are filled and discharged under the influence of a difference of pressure produced on the opposite sides of the said tanks, a battery-unit comprising a cradle mounted on a rotating axis, a number of insulated holders carried by said cradle, an offset inspection or man-hole closure for each of said holders, discharge fittings and inlet fittings for said holders, said discharge fittings having multiple connections or attachments, the discharge fittings being carried by said closures, and inlet and outlet manifolds turning with said cradle.

9. In a plant for pasteurizing milk and other liquids by a holding process in which a holding tank is filled and discharged under the influence of a difference of pressure produced on the opposite sides of the said tank, a unit comprising a closed holder, having discharge fittings and inlet fittings, a cradle in which said holder is carried, and a graduated insulation for said holder produced by varying the depth of the insulation from the top to the bottom.

10. A plant for pasteurizing milk and other liquids by the holding process, of the kind in which the liquid is fed into and discharged from stationary containers by a difference of pressure produced on the opposite sides of said containers, comprising a cradle, a number of similar closed containers mounted in said cradle, and filling and discharging fittings for said containers, so that the whole forms one unit.

11. A plant for pasteurizing milk and other liquids by the holding process, of the kind in which the liquid is fed into and discharged from stationary containers by a difference of pressure produced on the opposite sides of said containers, comprising a cradle, a number of similar closed containers mounted in said cradle, filling and discharging fittings for said containers, and inlet and outlet manifolds connected respectively to said filling and discharging fittings, so that the whole forms one unit.

12. A plant for pasteurizing milk and other liquids by the holding process, of the kind in which the liquid is fed into and discharged from stationary containers by a difference of pressure produced on the opposite sides of said containers, comprising a cradle, a number of similar closed containers eccentrically mounted in said cradle, and filling and discharging fittings for said containers, so that the whole forms one unit.

In testimony whereof, I affix my signature.

RICHARD SELIGMAN.